(12) United States Patent
Badgley

(10) Patent No.: US 9,442,966 B2
(45) Date of Patent: Sep. 13, 2016

(54) EXTENDING THE RECOVERY AND REPORTING RANGES OF OBJECTS

(71) Applicant: CA, Inc., Islandia, NY (US)

(72) Inventor: Andrew J. Badgley, Oswego, IL (US)

(73) Assignee: CA, Inc., Islandia, NY (US)

( * ) Notice: Subject to any disclaimer, the term of this patent is extended or adjusted under 35 U.S.C. 154(b) by 236 days.

(21) Appl. No.: 14/155,681

(22) Filed: Jan. 15, 2014

(65) Prior Publication Data
US 2015/0199238 A1    Jul. 16, 2015

(51) Int. Cl.
*G06F 11/14*    (2006.01)
*G06F 17/30*    (2006.01)

(52) U.S. Cl.
CPC ... *G06F 17/30321* (2013.01); *G06F 17/30144* (2013.01); *G06F 11/1469* (2013.01); *G06F 11/1471* (2013.01)

(58) Field of Classification Search
None
See application file for complete search history.

(56) References Cited

U.S. PATENT DOCUMENTS

| 7,031,981 | B1* | 4/2006 | DeLuca | G06F 3/0481 |
| 2002/0116340 | A1* | 8/2002 | Hellberg | G06F 21/105 705/59 |
| 2005/0138483 | A1* | 6/2005 | Hatonen | G06F 11/3466 714/45 |
| 2013/0073532 | A1* | 3/2013 | Bachar | G06F 7/32 707/704 |

* cited by examiner

*Primary Examiner* — Rehana Perveen
*Assistant Examiner* — Raheem Hoffler
(74) *Attorney, Agent, or Firm* — Stevens & Showalter, LLP

(57) ABSTRACT

The reporting and recovery of log activity in a computer system is extended by receiving an indication of a desired log activity to be retrieved, and by designating an active index file as a current index file. The current index file includes an inventory of log files, and is constrained in the number of log files. A searching operation is performed in an iterative process. The searching operation determines whether the desired log activity is within any of log files of the current file, designates a backup index file as the current index file if it is determined that the desired log activity is not within the current index file, and accesses a select log file within the current index file that includes the desired log activity, if it is determined that the desired log activity is within the current index file.

21 Claims, 11 Drawing Sheets

700

```
INDEX FILE   t=t4

LOG    ACTIVE LOGS
 1     NAME: ACTIVE.LOG.COPY1.DS2, RANGE: 21-25, STATUS: CURRENT
 2     NAME: ACTIVE.LOG.COPY1.DS3, RANGE: 11-15, STATUS: AVAILABLE
 3     NAME: ACTIVE.LOG.COPY1.DS1, RANGE: 16-20, STATUS: AVAILABLE

LOG    ARCHIVE LOGS
 1     NAME: ARCHIVE.LOG.A0000004, RANGE: 16-20
 2     NAME: ARCHIVE.LOG.A0000003, RANGE: 11-15
 3     NAME: ARCHIVE.LOG.A0000002, RANGE: 6-10
 4     NAME: ARCHIVE.LOG.A0000001, RANGE: 1-5
 5

BACKUPS:
NAME: INDEX FILE_BACKUP.LOG.B0000004 = INDEX FILE @ t=t3
NAME: INDEX FILE_BACKUP.LOG.B0000003 = INDEX FILE @ t=t2
NAME: INDEX FILE_BACKUP.LOG.B0000002 = INDEX FILE @ t=t1
NAME: INDEX FILE_BACKUP.LOG.B0000001 = INDEX FILE @ t=t0
```

INDEX FILE   t=t7

LOG    ACTIVE LOGS
  1     NAME: ACTIVE.LOG.COPY1.DS2, RANGE: 36-40, STATUS: CURRENT
  2     NAME: ACTIVE.LOG.COPY1.DS3, RANGE: 26-30, STATUS: AVAILABLE
  3     NAME: ACTIVE.LOG.COPY1.DS1, RANGE: 31-35, STATUS: AVAILABLE

LOG    ARCHIVE LOGS
  1     NAME: ARCHIVE.LOG.A0000007, RANGE: 31-35
  2     NAME: ARCHIVE.LOG.A0000006, RANGE: 26-30
  3     NAME: ARCHIVE.LOG.A0000005, RANGE: 21-25
  4     NAME: ARCHIVE.LOG.A0000004, RANGE: 16-20
  5     NAME: ARCHIVE.LOG.A0000003, RANGE: 11-15

BACKUPS:
NAME: INDEXFILE__BACKUP.LOG.B0000007, INDEX FILE @ t=t6
NAME: INDEXFILE__BACKUP.LOG.B0000006, INDEX FILE @ t=t5
NAME: INDEXFILE__BACKUP.LOG.B0000005, INDEX FILE @ t=t4
NAME: INDEXFILE__BACKUP.LOG.B0000004, INDEX FILE @ t=t3
NAME: INDEXFILE__BACKUP.LOG.B0000003, INDEX FILE @ t=t2
NAME: INDEXFILE__BACKUP.LOG.B0000002, INDEX FILE @ t=t1
NAME: INDEXFILE__BACKUP.LOG.B0000001, INDEX FILE @ t=t0
```

FIG. 10

… # EXTENDING THE RECOVERY AND REPORTING RANGES OF OBJECTS

BACKGROUND

The present disclosure relates in general to computer systems and in particular, to extending the recovery and reporting ranges of objects in systems that maintain limited historical information.

Computer systems that operate database server products, messaging system products, and other network server products typically generate historical log files. Such log files are useful for certain reporting applications. Moreover, the log files provide an opportunity to recover previous versions of critical information, such as to revert back to a previous version or a previous state of operation. In this regard, a system may generate and store numerous log files. In order to manage these log files, a system can use a specific file that serves as a manifest of the log files that have been generated.

In practical implementations, it is often necessary to limit the size of individual log files. For instance, a log file may be size-limited to correspond with the longest unit of work in an application program that generates the events to be recorded in the log file. As another example, a log file may be size-limited due to the available space of a destination that the log file is copied to for backup, e.g., to avoid space abends when writing the log file. Thus, for instance, the backup medium may be a limiting factor in the selection of the log file size.

BRIEF SUMMARY

According to aspects of the present disclosure herein, in a computer system, the reporting and recovery range of log activity is extended by receiving an indication of a desired log activity to be retrieved, and by designating an active index file that is utilized by the computer system, as a current index file. In this regard, the current index file includes an inventory of log files. Also, the current index file is constrained in the number of log files therein. Here, the designation of the index file as the "current" index serves as a placeholder to allow the substitution of historical backup instances of the active index file, e.g., backup index files, into the process in case the desired log activity is not located in the initial pass through of the active index file.

A searching operation is performed in an iterative process until a predetermined stopping condition is met. The searching operation includes determining whether the desired log activity is within any of the log files of the current index file. If the determination indicates that the desired log activity is not within the current index file, an operation is performed to obtain a new index file to search. The operation to obtain a new index file is performed by selecting one of the log files in the inventory of log files of the current index file, determining a backup index file that was created when the selected one of the log files was added to the active index file at some historical point, and designating the backup index file as a new instance of the current index file.

Correspondingly, if the determination indicates that the desired log activity is within the current index file, a select log file within the current index file is accessed, which includes the desired log activity and the predetermined stopping condition is designated as satisfied.

BRIEF DESCRIPTION OF THE DRAWINGS

FIG. 7 is the exemplary index file of FIG. 6 at a later point in time performing an offload of an active log file, according to aspects of the present disclosure herein;

FIG. 10 is the exemplary index file of FIG. 9 at a later point in time performing an offload of an active log file, according to aspects of the present disclosure herein.

DETAILED DESCRIPTION

Aspects of the present disclosure provide solutions for extending the recovery and reporting ranges of objects in a computer system, e.g., in a mainframe computing system.

In mainframe systems, it is common for certain applications, such as database systems, messaging systems and other information management applications to generate log files. In this regard, an "index file" can be used to inventory various log files that have been generated by the information management application. Typically, the index file inventories a limited number of active log files, a limited number of archive log files, or both. Moreover, the active log files are continually reused. For instance, an active log file is used to create an archive log file when the active log file is full. Thus, archive log files will ultimately drop out of the index file when the index file inventory limit is reached. Unfortunately, in many systems, there is no convenient way to find an object in an archive log file that has dropped out of the index file, such as may be necessary for recovery purposes, reporting purposes or both.

However, according to aspects of the present disclosure, an automated process is provided for extending the recovery and reporting ranges of objects. In particular, the automated process can locate objects in archive log files that have dropped out of a corresponding index file. Moreover, the automated process may not require modification to the underlying software system, and no changes may be required to the function, management, or configuration of the index file or of the log files generated by corresponding information management system.

Figure 1:
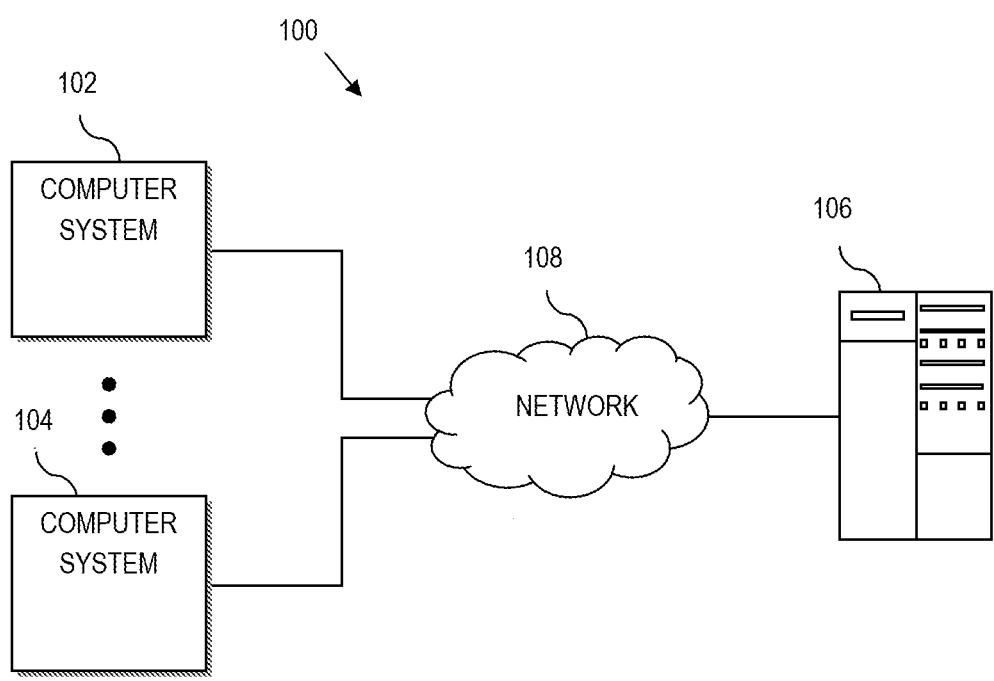
FIG. 1 is a block diagram of an exemplary system for extending the reporting and recovery range of log activity, according to aspects of the present disclosure.

System Overview:

Referring to figures, and specifically to FIG. 1, an environment 100 for extending the reporting range of log activity is shown. For simplicity of discussion, FIG. 1 illustrates two computer systems 102, 104 that are connected to a server 106 through a network 108. In exemplary implementations, each of the computer systems 102, 104 may be implemented as a server computer, an appliance, personal computer, a laptop, a cell phone, a smart phone, a tablet computer, pervasive computing device, etc. While two computer systems 102, 104 are shown, any number of computer systems may be coupled to the server 106 across the network 108.

The server 106 may, in practice, be implemented as a mainframe computer system that is further connected to archive storage technology such as a tape drive system, an external hard disk (or disks), optical storage, solid-state storage, cloud storage, etc., or combinations thereof. The archive storage technology may thus be co-located with the mainframe computer server 106, or the archive storage technology may be distributed across different locations. Moreover, the archive storage technology may be continuously on-line or archived information may be selectively on-line and off-line, such as where tape cartridges are loaded and ejected from a corresponding tape system, etc. The server 106 supports one or more applications that maintain an index file, which is utilized to inventory a limited number of log files, as will be described in greater detail herein.

The network 108 may include a wide-area network (WAN), local-area network (LAN), the Internet, a peer-to-peer network, wireless local-area network (WLAN), other wireless technology, in other ways that facilitate communication, etc.

As such, the environment 100 may be used to implement methods for extending the recovery and reporting ranges of objects, as described more fully herein. In this regard, the methods may be implemented in any of the components, including computer system 102, computer system 104, server 106, network 108, split there among, etc.

Figure 2:
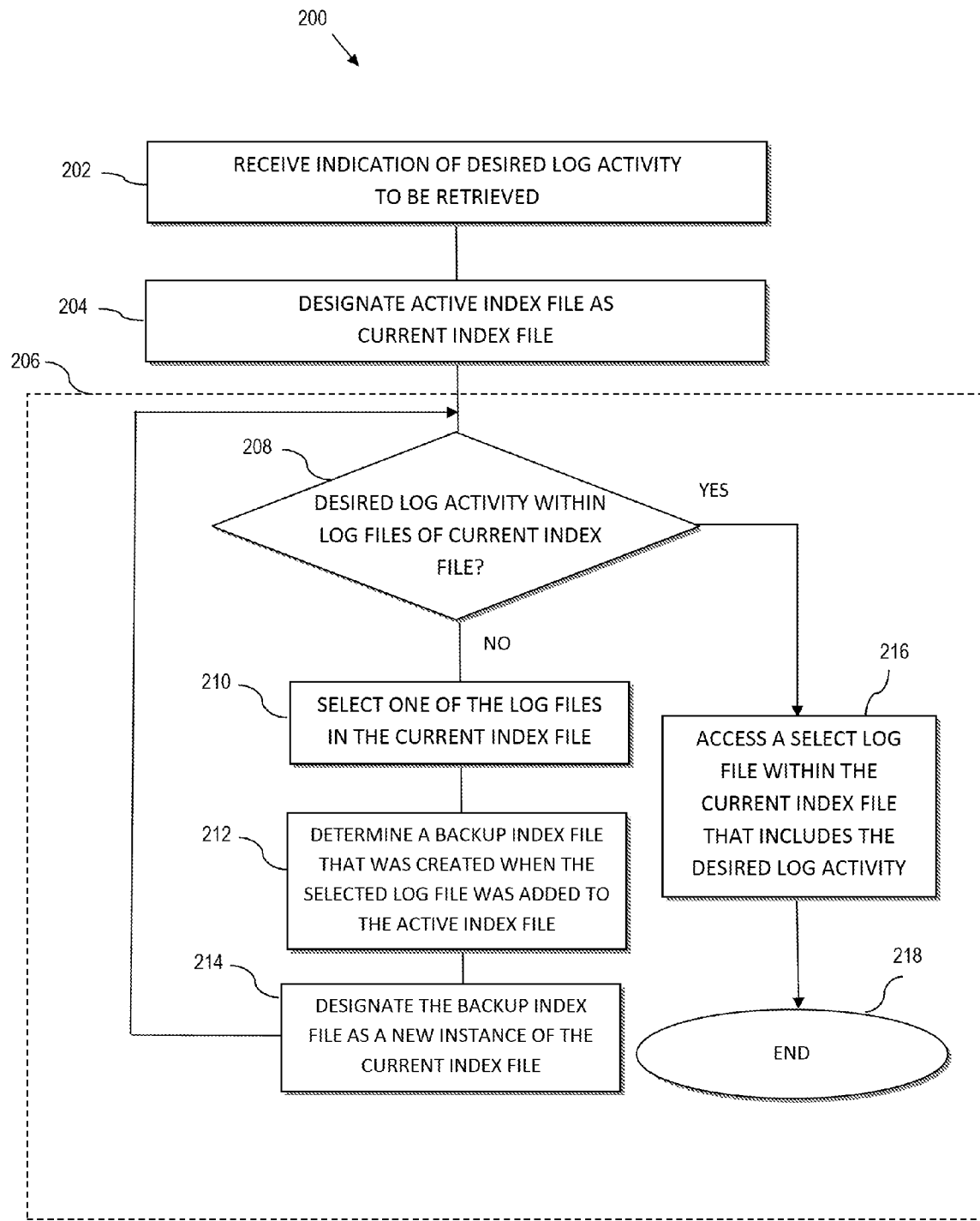
FIG. 2 is a flow chart illustrating a method for extending the reporting and recovery range of log activity, according to aspects of the present disclosure.

General Approach:

Referring to FIG. 2, a machine-executable method 200 is provided, which may be executed on a computer system for extending the reporting and recovery range of log activity. The method may be implemented for instance, within the system of FIG. 1. In this regard, the method 200 may be implemented as computer-readable hardware that stores machine-executable program code, where the program code instructs a processor to implement the described method. The method 200 may also be executed by a processor coupled to a memory (e.g., the computer system 102, 104; the server 106; of FIG. 1) wherein the processor is programmed to perform the described method.

The method 200 comprises receiving at 202, an indication of a desired log activity to be retrieved. The method 200 also comprises designating, at 204, an active index file that is utilized by the computer system, as a current index file. The current index file includes an inventory of log files. Moreover, the current index file is constrained in the number of log files therein. Here, the designation of the index file as the "current" index serves as a placeholder to allow the substitution of historical backup instances of the active index file, e.g., backup index files, into the process in case the desired log activity is not located in the initial pass through of the active index file.

By way of illustration, an index file may comprise the Boot Strap Data Set (BSDS) of DB2. In practice, the BSDS contains a limited amount of information regarding where historical DB2 log activity can be found. Since DB2 is constantly creating new log activity, each time a DB2 active log is filled up and offloaded to an archive log, the entry for the oldest archive log is lost. Depending upon the frequency at which the active logs are offloaded to archive logs, it is possible for an archive log to drop out of the BSDS in a relatively short time frame, e.g., an archive log can drop out of the BSDS within days of creation. Notably, the archive log still exists. However, the archive log is not available for location through the BSDS. As such, applications that rely upon the BSDS cannot make use of that archive log for recovery or reporting purposes.

The method 200 further comprises performing, at 206, a searching operation in an iterative process until a predetermined stopping condition is met. The searching operation includes determining, at 208, whether the desired log activity is within any of the log files in the current index file.

The searching operation also includes designating a backup index file as a new instance of the current index file if it is determined that the desired log activity is not within the current index file. Here, the backup index file is a backup that was created when a select one of the log files was added to the inventory of log files of the active index file at some historical point. More particularly, the designation of a backup index file as a new instance of the current index file is performed by selecting, at 210, one of the log files in the inventory of log files of the current index file, by determining, at 212, a backup index file that was created when the selected one of the log files was added to the active index file at some historical point, and by designating, at 214, the backup index file as a new instance of the current index file.

The method 200 still further includes accessing, at 216, a select log file within the current index file that includes the desired log activity, if it is determined that the desired log activity is within the current index file, and designating, at 218 the predetermined stopping condition satisfied.

In an exemplary implementation, the searching operation at 206 may be performed by building a list of the log files in the current index file. In this regard, a determination is made at 208 as to whether the desired log activity is within any of the log files within the current index file by using the list for comparing the desired log activity against the log files in the current index file.

As yet another example, in an exemplary implementation, the indication of a desired log activity to be retrieved at 202 is implemented by receiving an indication of a start value for the desired log activity to be retrieved. Also, the searching operation at 206 is performed by building a list of the log files in the current index file. In this example, the determination, at 208, as to whether the desired log activity is within any of log files within the current index file, is implemented by identifying at least a start value and an end value of log activity in each log file in the current index file. The determination also includes using the list for comparing the start value of the desired log activity against the start value and the end value of accessible log files in the current index file.

Keeping with the above-exemplary implementation, in the context of DB2, the list may be built by reading the DB2 BSDS and building a list of the archive and active log files that are recorded in that file. Each active log file and each archive log file is represented in the BSDS as an entry that specifies the start and end values of the log activity found on that file. Thus, the start value for the desired log activity to be retrieved can be compared against the ranges identified by the active log files and archive log files within the current index file.

Thus, after all of the necessary information has been gathered, the method 200 can check the start and end values of the entries in the current index file (e.g., the active BSDS or a backup thereof) against the start value of the desired log activity to be retrieved. Once the method 200 has found which archive log file or which active log file contains the start of the desired log activity (or log activity range), the method can continue by performing a suitable next process, e.g., open that selected file and start reading log activity information therein, such as for reporting or recovery purposes.

However, if the desired log activity is for a point prior to the oldest archive log entry in the active index file (e.g., the active BSDS), the method need not stop and throw an error simply because the necessary information could not be located. Rather, the method takes advantage of a process whereby, a backup copy of the active index file itself is created before an active log file is copied to an archive log file and an entry for the archive log file is added to the active index file. The backup of the active index file at the time of active file copy can be carried out by the method itself, or based upon other processes, including native processes. For instance, every time DB2 offloads an active log thus creating an archive log, DB2 also creates a backup copy of the BSDS.

As such, when the method 200 performs a search for the desired log activity, if a determination is made that the desired start value is for a point prior to the oldest archive log entry in the BSDS, the method reads a backup copy of the active index taken at some historical point in time. For instance, as noted above, the method selects one of the log files in the inventory of log files of the current index file, such as by selecting the oldest log file in the current index file. In the case of BSDS, the current index file actually comprises an index of active logs and an index of archive logs. In such an instance, the method may select the oldest log file in the index of archive logs. However, other log files could be selected.

For example, in an illustrative implementation, the method reads the backup copy of the active index file that was taken, e.g., when the oldest archive log entry was added to the active index file. By designating the backup as the "current" index file, an iterative process can continue to search through one or more backups of the active index file.

In the above example, the method adds the archive log information found in the backup copy of the BSDS to the range information and again tries to find the archive log file that contains the desired log activity to be retrieved. If the desired log activity to be retrieved has a start value that is still prior to the oldest archive log entry, then the method continues to iterate by reading the backup copy of the BSDS that was taken when the (now) oldest archive log entry was added to the BSDS, designating the backup as the "current" index file to continue the iterative process.

Because of the flexibility of the method 200 in locating the desired log activity, aspects of the present disclosure facilitate enhanced computer functionality, such as for performing a data recovery operation on the computer system based upon the information obtained by accessing the select log file that includes the desired log activity, or for generating a data report on the computer system based upon the information obtained by accessing the select log file that includes the desired log activity. Moreover, the method 200 may be implemented by generating, by a native process associated with the active index file, the backup of the index file when an active log file is copied and that copy is added to the archive log inventory of the active index file. Still further, the method can extend the functionality of the underlying computer system by facilitating the backup operation.

Working Example

Referring to FIGS. 3-10 in general, the state of an index file and corresponding backup(s) is illustrated at several points in time. Each successive FIGURE represents the same index file and backup(s) at a future point in time where an active log file is copied to an archive log file and the corresponding active index file backup is performed. As such, each state is represented with a reference numeral 100 higher than the previous FIGURE. In this example, the active index file is constrained to a maximum of three active log entries (three active log files), solely for sake of illustration herein. Also, the active index file is constrained to a maximum of five archive log entries (five archive log files), again, solely for illustration herein. In practice, the number of active and/or archive can be different from that set out in this example.

Figure 3:
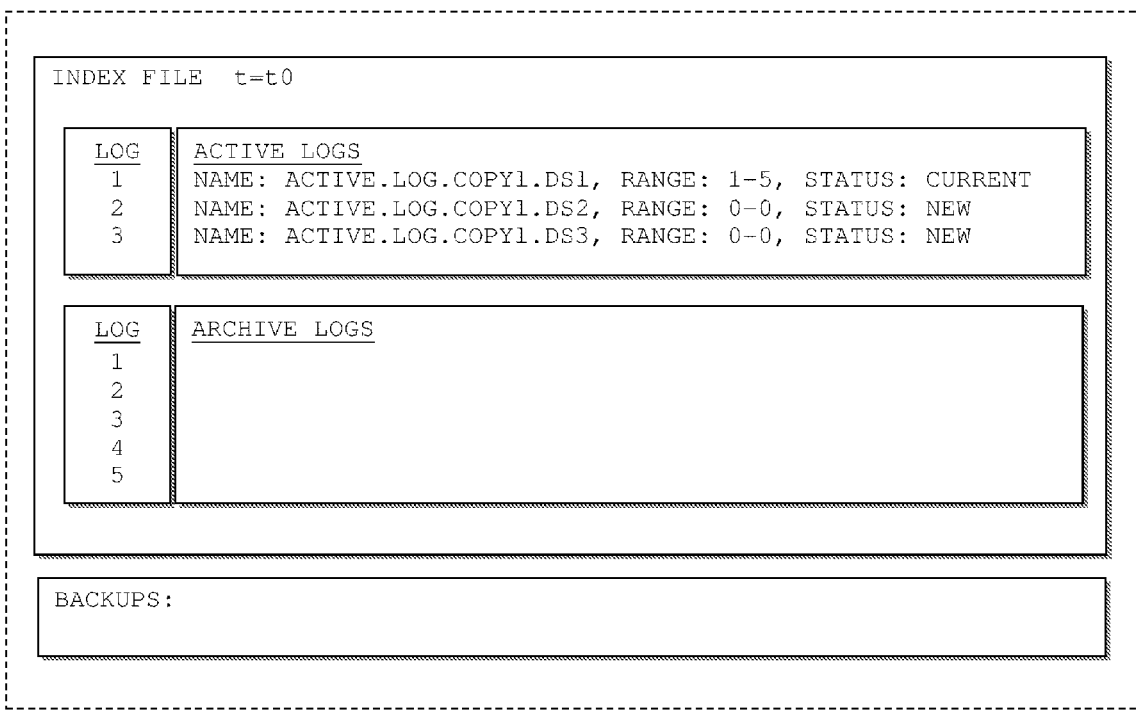
FIG. 3 is an exemplary index file at a fixed point in time, according to aspects of the present disclosure herein.

Referring to FIG. 3, an active index file is illustrated at a time t=0. At this exemplary time, ACTIVE.LOG. COPY1.DS1, RANGE: 1-5, STATUS: CURRENT represents the current active log file added to the index file. Since this is the start, there is no copying of the active file, so there is no backup of the active index file. If a search were to be performed for a desired log activity to be retrieved at t=t0, the result would necessarily be in the active index file because the only available activity range for log activity is 1-5, which all resides in the active index file. Here, a user can open the log file, e.g., ACTIVE.LOG.COPY1.DS1, and start reading its contents.

Figure 4:
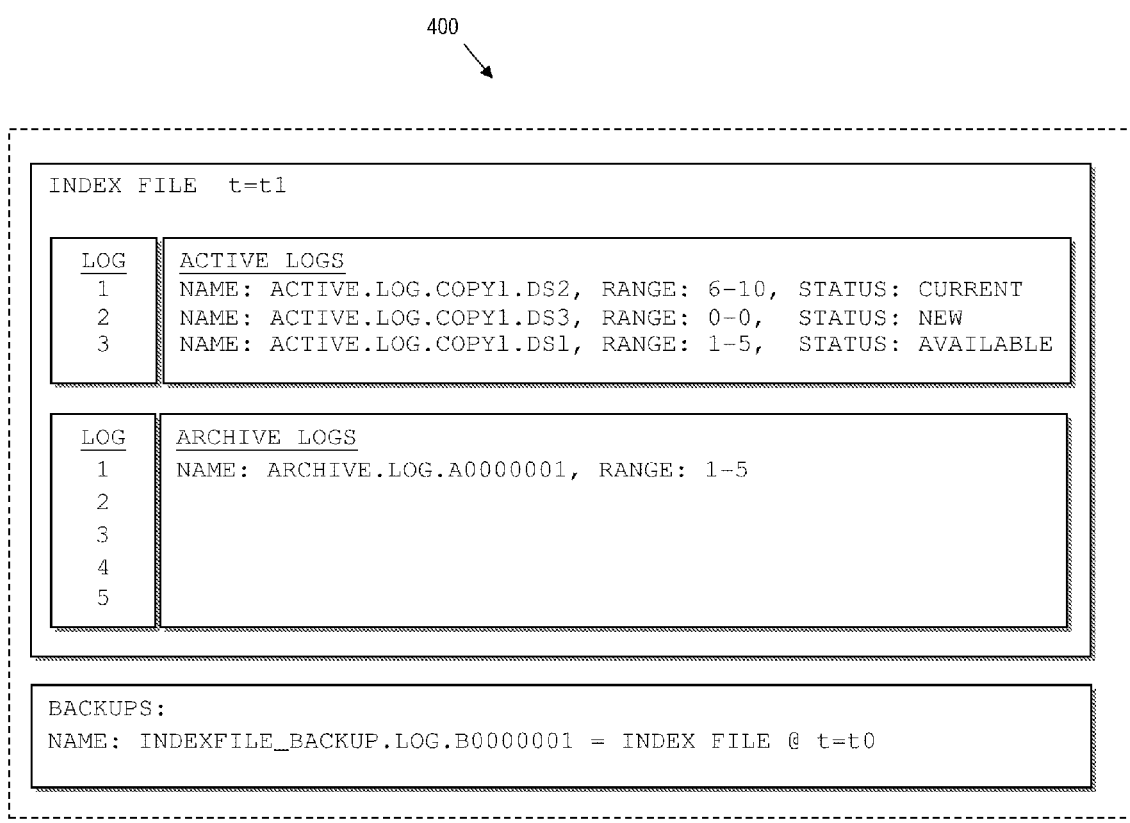
FIG. 4 is the exemplary index file of FIG. 3 at a later point in time performing an offload of an active log file, according to aspects of the present disclosure herein.

Referring to FIG. 4, the active index file of FIG. 3 is illustrated at a future point in time, i.e., t=t1. At this exemplary time, ACTIVE.LOG.COPY1.DS2, RANGE: 6-10, STATUS: CURRENT represents the current active log file added to the active index file. When this occurs, the status of RANGE: 1-5 is changed to "AVAILABLE" in the active log file. Moreover, RANGE 1-5 is copied to the archive as ARCHIVE.LOG.A0000001, RANGE: 1-5.

Before the copy operation, a backup copy of the state of the active index file is created that represents the state of the active index file at t=0 (FIG. 3). For instance, as illustrated, a backup, INDEXFILE_BACKUP.LOG.B0000001, is created. In this illustrative example, a naming convention is adopted, where the backup file is given a unique name that creates an association with the active index file at the current state. Note that the created archive log file has a name that includes " . . . A0000001", i.e., the letter "A" followed by a seven number extension. Correspondingly, the backup name includes "B0000001", i.e., the letter "B", followed by the same seven number extension used in the archive log. Thus, the backup index file that was created when the ARCHIVE.LOG.A0000001 file was added to the active index file, can be determined by matching the file name of the backup (INDEXFILE_BACKUP.LOG.B0000001 in this example) with the file name of the selected log file, regardless of the historical point at which the archive log file was created. The above example naming convention is carried through in FIGS. 5-10. In practice, other naming conventions can be used to create the association between the backup index files and the log files. Moreover, alternative approaches can be used to create the associations, e.g., via time stamps, etc.

If a search were to be performed for a desired log activity to be retrieved at t=t1, the result would necessarily be in the active index file because the only available activity range for log activity is 1-10, which all resides in the active index file. For instance, if a user needs log activity that falls in the range 1-5, a user, software program, etc., accesses the contents of ACTIVE.LOG.COPY1.DS1 and can start reading its contents.

Figure 5:
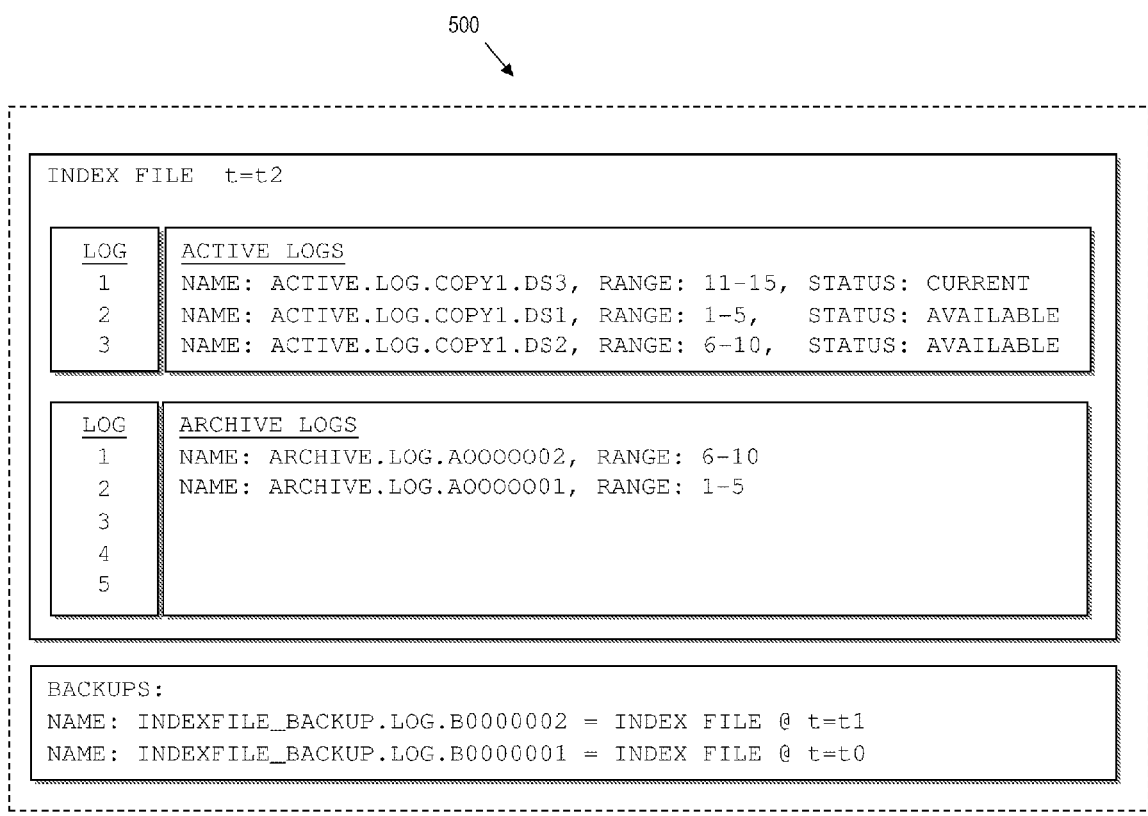
FIG. 5 is the exemplary index file of FIG. 4 at a later point in time performing an offload of an active log file, according to aspects of the present disclosure herein.

Referring to FIG. 5, the active index file of FIG. 4 is illustrated at a future point in time, i.e., t=t2. At this exemplary time, ACTIVE.LOG.COPY1.DS3, RANGE:

11-15, STATUS: CURRENT represents the current active log file added to the active index file. When this occurs, the status of RANGE: 6-10 is changed to "AVAILABLE" in the active log file. The log file for RANGE 1-5 remains in the active log. Moreover, RANGE 6-10 is copied to the archive as ARCHIVE.LOG.A0000002, RANGE: 6-10. Before the copy operation, a backup copy of the state of the active index file is created that represents the state of the active index file at t=t1 (FIG. 4). As illustrated, the backup of the active index file is INDEXFILE_BACKUP.LOG.B0000002. If a search were to be performed for a desired log activity to be retrieved at t=t2, the result would necessarily be in the active index file because the only available activity range for log activity is 1-15, which all resides in the active index file. Note however, that now there are two backups of the active index file. One reflecting the active index file at t=t0 and one reflecting the active index file at t=t1.

Figure 6:
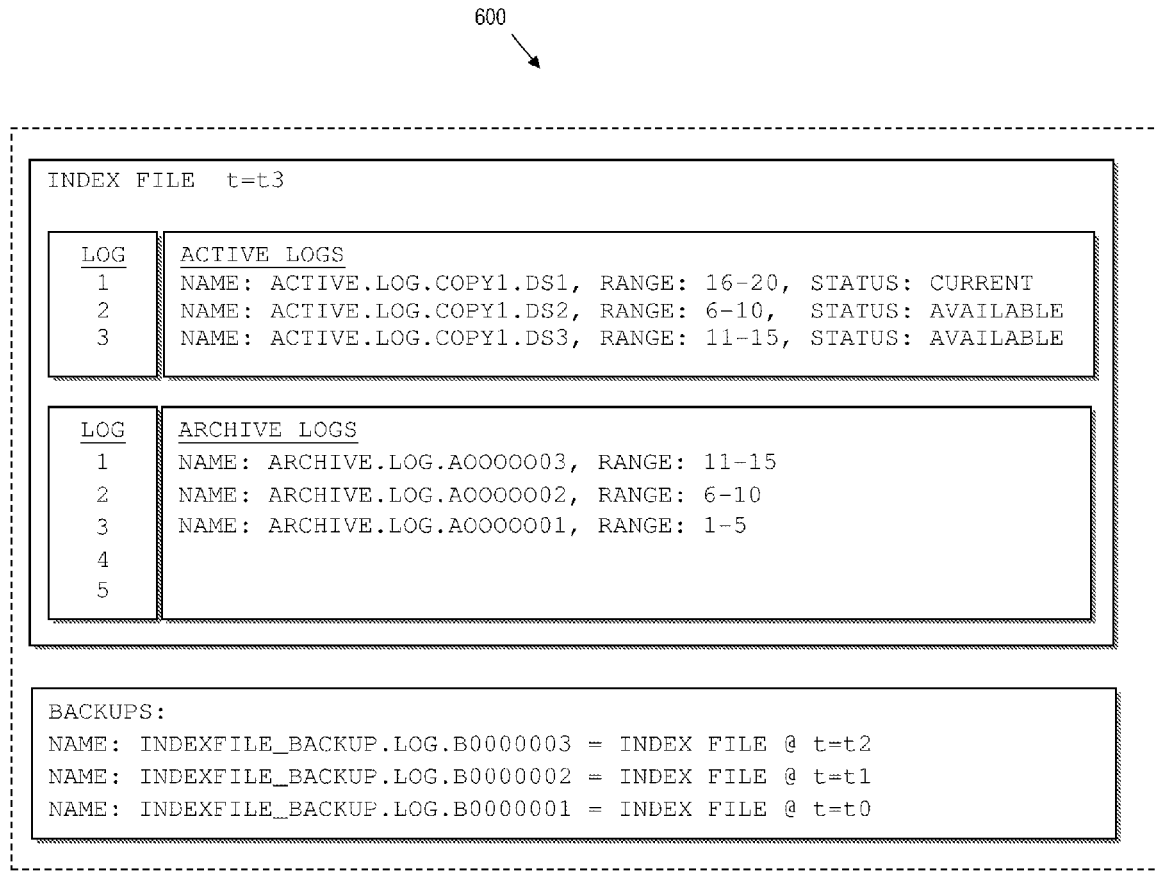
FIG. 6 is the exemplary index file of FIG. 5 at a later point in time performing an offload of an active log file, according to aspects of the present disclosure herein.

Referring to FIG. 6, the active index file of FIG. 5 is illustrated at a future point in time, i.e., t=t3. At this exemplary time, ACTIVE.LOG.COPY1.DS1, RANGE: 16-20, STATUS: CURRENT represents the current active log file added to the active index file. When this occurs, the status of RANGE: 11-15 is changed to "AVAILABLE" in the active log file. The log file for RANGE 6-10 remains in the active log. However, the log file for the RANGE 1-5 drops out of the active log file. Moreover, RANGE 11-15 is copied to the archive as ARCHIVE.LOG.A0000003, RANGE: 11-15. Before the copy operation, a backup copy of the state of the active index file is created that represents the state of the active index file at t=t2 (FIG. 5). For instance, as illustrated, the backup of the active index file is INDEX-FILE_BACKUP.LOG.B0000003. If a search were to be performed for a desired log activity to be retrieved at t=t3, the result would necessarily be in the active index file because the only available activity range for log activity is 1-20, all reside in the active index file on the active or archive log files. Note however, that now there are three backups of the active index file. One reflecting the active index file at t=t0, one reflecting the active index file at t=t1 and one reflecting the active index file at t=t2.

Referring to FIG. 7, the active index file of FIG. 6 is illustrated at a future point in time, i.e., t=t4. At this exemplary time, ACTIVE.LOG.COPY1.DS1, RANGE: 21-25, STATUS: CURRENT represents the current active log file added to the active index file. When this occurs, the status of RANGE: 16-20 is changed to "AVAILABLE" in the active log file. The log file for RANGE 11-15 remains in the active log. However, the log file for the RANGE 6-10 drops out of the active log file. Moreover, RANGE 16-20 is copied to the archive as ARCHIVE.LOG.A0000004, RANGE: 16-20. Before the copy operation, a backup copy of the state of the active index file is created that represents the state of the active index file at t=t3 (FIG. 6). For instance, as illustrated, the backup of the active index file is INDEX-FILE_BACKUP.LOG.B0000004. If a search were to be performed for a desired log activity to be retrieved at t=t4, the result would necessarily be in the active index file because the only available activity range for log activity is 1-25, all reside in the active index file on the active or archive log files. Note however, that now there are four backups of the active index file. One reflecting the active index file at t=t0, one reflecting the active index file at t=t1, one reflecting the active index file at t=t2 and one reflecting the active index file at t=t3.

Figure 8:
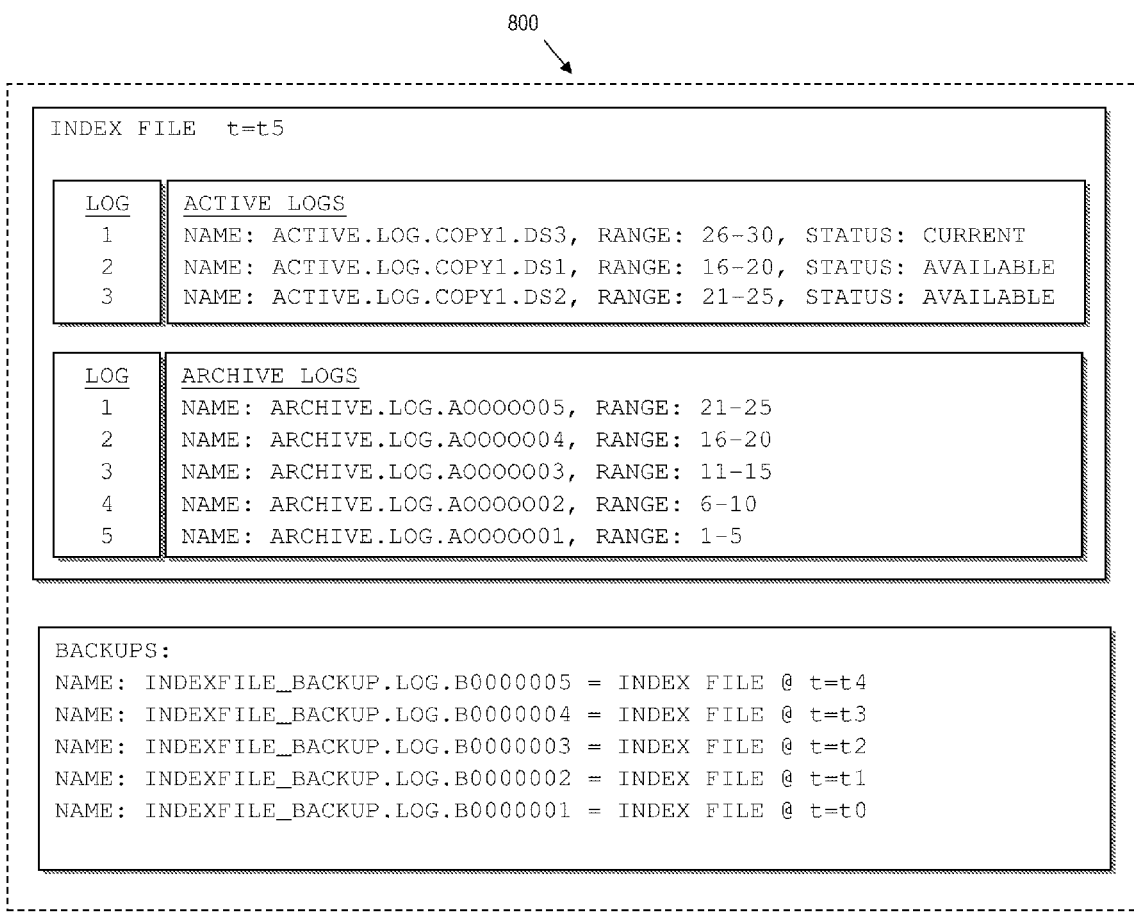
FIG. 8 is the exemplary index file of FIG. 7 at a later point in time performing an offload of an active log file, according to aspects of the present disclosure herein.

Referring to FIG. 8, the active index file of FIG. 7 is illustrated at a future point in time, i.e., t=t5. At this exemplary time, ACTIVE.LOG.COPY1.DS1, RANGE: 26-30, STATUS: CURRENT represents the current active log file added to the active index file. When this occurs, the status of RANGE: 21-25 is changed to "AVAILABLE" in the active log file. The log file for RANGE 16-20 remains in the active log. However, the log file for the RANGE 11-15 drops out of the active log file. Moreover, RANGE 21-25 is copied to the archive as ARCHIVE.LOG.A0000005, RANGE: 21-25. Before the copy operation, a backup copy of the state of the active index file is created that represents the state of the active index file at t=t4 (FIG. 7). For instance, as illustrated, the backup of the active index file is INDEX-FILE_BACKUP.LOG.B0000005. If a search were to be performed for a desired log activity to be retrieved at t=t5, the result would necessarily be in the active index file because the only available activity range for log activity is 1-30, all reside in the active index file on the active or archive log files. Note however, that now there are five backups of the active index file. One reflecting the active index file at t=t0, one reflecting the active index file at t=t1, one reflecting the active index file at t=t2, one reflecting the active index file at t=t3 and one reflecting the active index file at t=t4.

Figure 9:
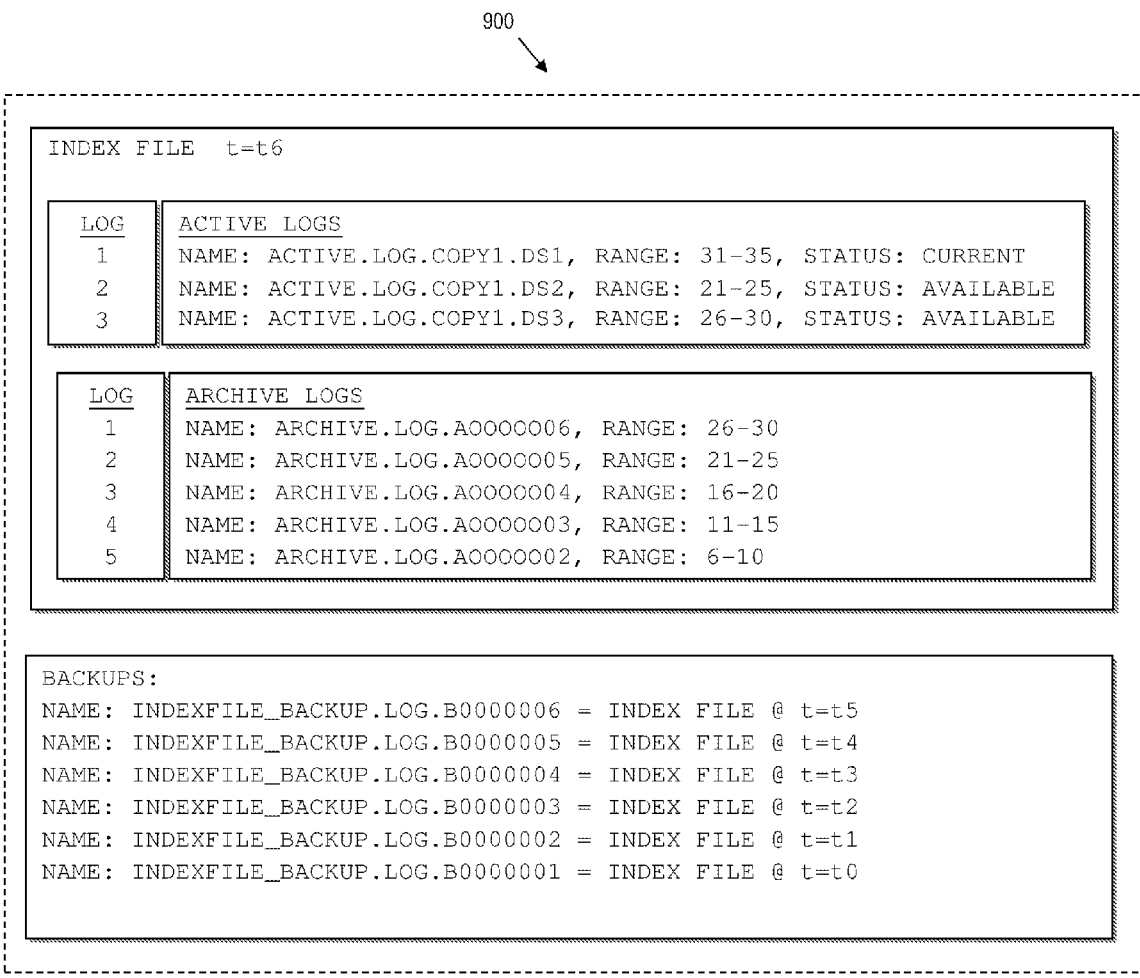
FIG. 9 is the exemplary index file of FIG. 8 at a later point in time performing an offload of an active log file, according to aspects of the present disclosure herein.

Referring to FIG. 9, the active index file of FIG. 8 is illustrated at a future point in time, i.e., t=t6. At this exemplary time, ACTIVE.LOG.COPY1.DS1, RANGE: 21-35, STATUS: CURRENT represents the current active log file added to the active index file. When this occurs, the status of RANGE: 26-30 is changed to "AVAILABLE" in the active log file. The log file for RANGE 21-25 remains in the active log. However, the log file for the RANGE 16-20 drops out of the active log file. Moreover, RANGE 26-30 is copied to the archive as ARCHIVE.LOG.A0000006, RANGE: 26-30. Before the copy operation, a backup copy of the state of the active index file is created that represents the state of the active index file at t=t5 (FIG. 8). For instance, as illustrated, the backup of the active index file is INDEX-FILE_BACKUP.LOG.B0000006. If a search were to be performed for a desired log activity to be retrieved at t=t6, the result may not be in the active index file because the only available activity range for log activity is 6-35. Note however, that now there are six backups of the active index file. One reflecting the active index file at t=t0, one reflecting the active index file at t=t1, one reflecting the active index file at t=t2, one reflecting the active index file at t=t3, one reflecting the active index file at t=t4 and one reflecting the active index file at t=t5.

Referring to FIG. 10, the active index file of FIG. 9 is illustrated at a future point in time, i.e., t=t7. At this exemplary time, ACTIVE.LOG.COPY1.DS1, RANGE: 36-40, STATUS: CURRENT represents the current active log file added to the active index file. When this occurs, the status of RANGE: 31-35 is changed to "AVAILABLE" in the active log file. The log file for RANGE 26-30 remains in the active log. However, the log file for the RANGE 21-25 drops out of the active log file. Moreover, RANGE 31-35 is copied to the archive as ARCHIVE.LOG.A0000007, RANGE: 31-35. Before the copy operation, a backup copy of the state of the active index file is created that represents the state of the active index file at t=t6 (FIG. 9). For instance, as illustrated, the backup of the active index file is INDEX-FILE_BACKUP.LOG.B0000007. If a search were to be performed for a desired log activity to be retrieved at t=t7, the result may not be in the active index file because the only available activity range for log activity is 11-40. Note however, that now there are seven backups of the active index file. One reflecting the active index file at t=t0, one reflecting the active index file at t=t1, one reflecting the active index file at t=t2, one reflecting the active index file at t=t3, one reflecting the active index file at t=t4, one reflecting the active index file at t=t5 and one reflecting the active index file at t=t6.

With reference to the preceding FIGURES generally, assume that at t=t6 (FIG. 9), a user wants a log activity with a Start number in the range of 1-5. Using the methods described herein (e.g., the method 200 described with reference to FIG. 2), the active index file is designated the "current" index file and a searching operation is performed. However, a determination as to whether the desired log activity is within any of log files of the current file indicates that the desired log activity is not within the current index file.

However, aspects of the present disclosure herein extend the reporting range of log activity. For instance, keeping with the current example, the method designates a backup index file that was created when a select one of the log files was added to the inventory of log files of the active index file at some historical point, as a new instance of the current index file.

More specifically, the method selects one of the log files in the inventory of log files of the current index file. As an illustrative example, assume that the select one of the log files corresponds to the oldest one of the log files that was added to the active index file. With reference to FIG. 9, (t=t6) the method selects the oldest archive log, which is ARCHIVE.LOG.AOOOOO02, RANGE: 6-10 in this example.

The method then determines a backup index file that was created when the selected one of the log files was added to the active index file at some historical point. Here, the backup that was created before this archive log was added to the active index file is correspondingly, INDEXFILE_BACKUP.LOG.B0000002=ACTIVE INDEX DATASET @ t=t1, i.e., the state of the active index file at t=1 (seen in FIG. 4).

The method then designates the backup index file as a new instance of the current index file. Referring to FIG. 4, if the method of FIG. 2 now sets this backup version as the current index file, it can be seen that a search of the new instance of the current index reveals the log file in the RANGE 1-5 in the archive log data. As such, the entire history of log activity can be retrieved, despite the active index file dropping visibility to the log activity of RANGE 1-5. Note that in practice the backup index file could have been selected based upon any of the other entries in the archive log. However, selecting the oldest archive may lead to reduced search time by minimizing the number of backups that may ultimately need to be searched to locate the desired log activity.

Referring specifically to FIG. 10, keeping with the same example, assume the time has now advanced to t=t7 and the desired log activity is in the RANGE 1-5. The active index file is designated the "current" index file and a searching operation is performed. However, the determination as to whether the desired log activity is within any of log files of the current file indicates that the desired log activity is not within the current index file.

As such, the method designates a backup index file that was created when a select one of the log files was added to the inventory of log files of the active index file at some historical point, as a new instance of the current index file.

As an illustrative example, assume that the select one of the log files corresponds to the oldest one of the files that was added to the active index file (e.g., the oldest entry in the archive of the current index file). The oldest archive log is ARCHIVE.LOG.AOOOOO03, RANGE: 11-15. The backup that was created before the offload is correspondingly, INDEXFILE_BACKUP.LOG.B0000003=INDEX DATASET @ t=t2, i.e., the state of the active index file at t=2 (seen in FIG. 5). Referring to FIG. 5, if the method of FIG. 2 now sets this backup version as the new instance of the current index file, a search of the new current index reveals the log file in the RANGE 1-5 (as well as the log file in the RANGE 6-10) in the archive log data. As such, the entire history of log activity can be retrieved, despite the active index file dropping visibility to the log activity of RANGE 1-10.

As yet another example, assume that a new log file is written that covers a range of precisely five records consistently per the examples of FIGS. 3-10 (this is purely for simplicity of discussion and the range can vary for each entry in practice). In this example, at t=t11, the oldest RANGE in the archive of the active index file is 31-35. Thus, the log activity in the RANGE 1-30 has dropped out of the active index file. However, the oldest archive log would be ARCHIVE.LOG.AOOOOO07, RANGE: 31-35, thus indicating that the corresponding backup INDEXFILE_BACKUP.LOG. B0000007, INDEX DATASET @ t=t6 is the version of the index file at t=t6 (FIG. 9). Thus, the current index file is set to INDEXFILE_BACKUP.LOG.B0000007, which is the state of the index file at t=t6 (FIG. 9). Accordingly, the approach herein, with only a single read of a backup file, can extract all log activity except RANGE 1-5. However, if a desired log activity is within the RANGE 1-5, the method continues to iterate. To get to RANGE 1-5, note that the oldest archive log in the current index file of FIG. 9 is ARCHIVE.LOG.AOOOOO02, RANGE: 6-10.

As such, corresponding INDEXFILE_BACKUP.LOG. B0000002=INDEX DATASET @ t=t1 is selected and is set to the next instance of the current index file (for purposes of searching). Referring to FIG. 4, the index file at t=t1 includes the log activity for RANGE 1-5 as the only entry in the archive. Thus, with two "hops", the method was able to trace back through any and all log activity that still remains on the system from t=t11 to t=t0, despite the active index file being constrained to a limited number of entries.

Observations:

According to the systems and methods herein, computer users that rely upon index files that are constrained in the number of log file entries therein, such as the BSDS of DB2, will not be limited to only the historical log activity found in the active index file, e.g., a user will not be limited to historical log activity found in DB2's BSDS. Rather, the user has automated access to all of the historical log activity information for as long as the archive logfiles and backup index files are kept on the computer system.

Various aspects of the present disclosure leverage the use of backup copies of an active index file (e.g., BSDS) that is taken whenever an active log file is copied and the archive log file entry added to the active index file. In this regard, backups of the index file can be traversed to extract historical information that was otherwise lost from view by automated systems, so long as the historical data persists on the computer system.

Because any file still available on the computer system can be located, the method 200 of FIG. 2 can be extended, such as by performing a data recovery operation on the computer system based upon the information obtained by accessing the select log file that includes the desired log activity, or by generating a data report on the computer system based upon the information obtained by accessing the select log file that includes the desired log activity.

Figure 11:
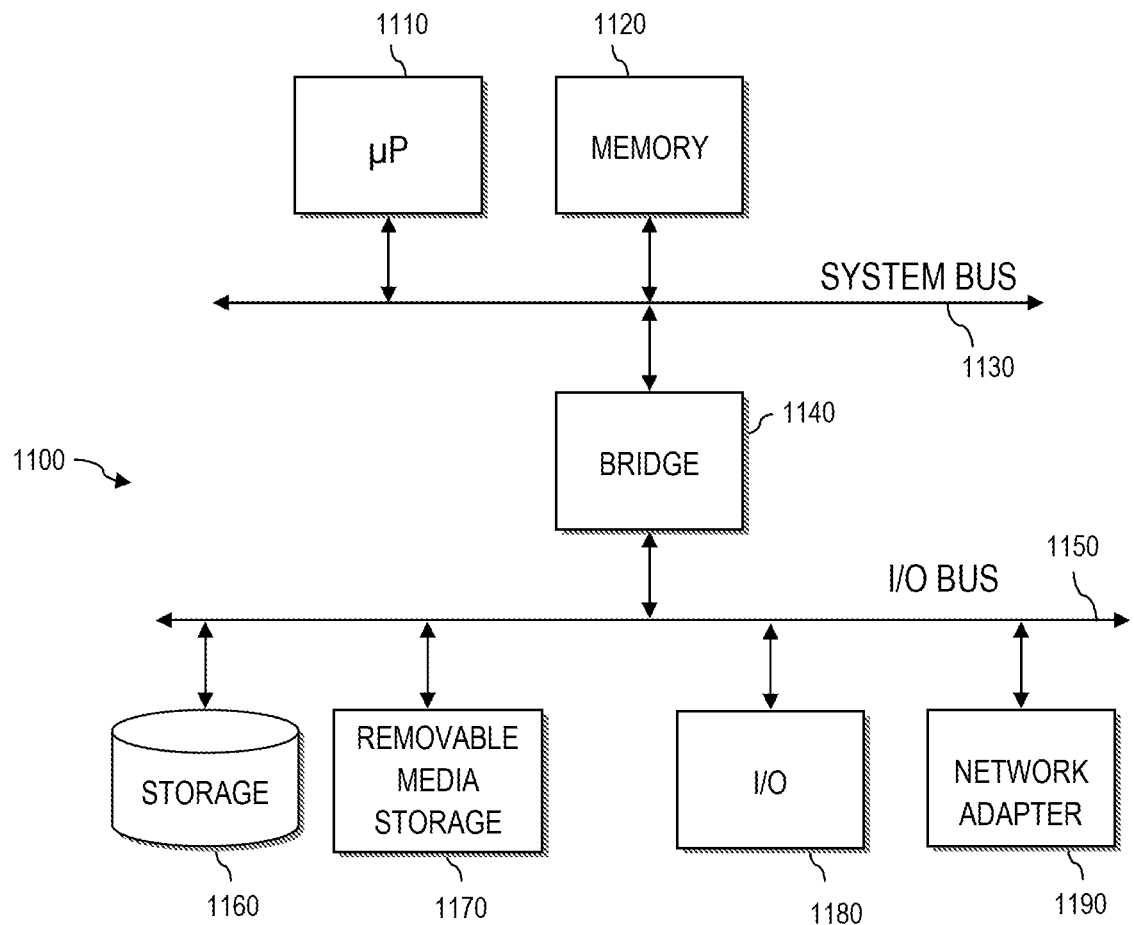
FIG. 11 is a schematic of a computer system comprising computer readable program code stored in computer readable hardware for executing any aspects described herein, according to various aspects of the present disclosure.

Miscellaneous:

Referring to FIG. 11, a schematic of an exemplary computer system (e.g., optionally one or more of the computer systems 102, 104, server 106 of FIG. 1) having computer readable program code for executing aspects described herein with regard to the preceding FIGURES. The computer system 1100 includes one or more microprocessors 1110 that are connected to memory 1120 via a system bus 1130. A bridge 1140 connects the system bus 1130 to an I/O Bus 1150 that links peripheral devices to the microprocessor(s) 1110. Peripherals may include storage 1160, such as a hard drive, removable media storage 1170, e.g., floppy, flash, CD and/or DVD drive, I/O device(s) 1180 such as a keyboard, mouse, etc. and a network adapter 1190. The memory 1120, storage 1160, removable media insertable into the removable media storage 1170 or combinations thereof, can be used to implement the methods, configurations, interfaces and other aspects set out and described herein.

Thus, the computer system may be used to implement a machine-executable method for extending the reporting range of log activity, according to one or more of the methods set out herein.

In this regard, the memory 1120, storage 1160, removable media insertable into the removable media storage 1170 or combinations thereof, can implement computer-readable hardware that stores machine-executable program code for extending the reporting range of log activity, wherein the program instructs a processor (e.g., microprocessor 1110) to perform one or more of the methods set out herein.

Still further, the exemplary computer system my be implemented as an apparatus for extending the reporting range of log activity in a computer system, which may comprise a processor (e.g., microprocessor 1110) coupled to a memory (e.g., memory 1120, storage 1160, removable media insertable into the removable media storage 1170 or combinations thereof), wherein the processor is programmed to perform extending the reporting range of log activity by executing program code to perform one or more of the methods set out herein.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. In a computer system, a machine-executable method for extending the reporting range of log activity, the method comprising:
   receiving an indication of a desired log activity to be retrieved;
   designating an active index file that is utilized by the computer system, as a current index file, wherein the current index file includes an inventory of log files comprising active log files, archive log files or both, and the current index file is constrained in the number of log files therein; and
   performing a searching operation in an iterative process until a predetermined stopping condition is met, the searching operation including:
      determining whether the desired log activity is within any of the log files of the current index file;
      performing, if the determination indicates that the desired log activity is not within the current index file, an operation to obtain a new index file by:
         selecting one of the log files in the inventory of log files of the current index file;
         determining a backup index file that was created when the selected one of the log files was added to the active index file at some historical point, where the backup index is separate from the active index file; and
         designating the backup index file as a new instance of the current index file, and
      accessing a select log file within the current index file that includes the desired log activity, if it is determined that the desired log activity is within the current index file, and designating the predetermined stopping condition satisfied.

2. The method of claim 1, wherein:
performing a searching operation in an iterative process, comprises:
   building a list of the log files in the current index file; and
determining whether the desired log activity is within any of the log files of the current index file, comprises:
   using the list for comparing the desired log activity against the log files in the current index file.

3. The method of claim 1, wherein:
receiving an indication of a desired log activity to be retrieved comprises:
   receiving an indication of a start value for the desired log activity to be retrieved;
performing a searching operation in an iterative process, comprises:
   building a list of the log files in the current index file; and
determining whether the desired log activity is within any of the log files of the current index file, comprises:
   identifying at least a start value and an end value of log activity in each log file in the current index file; and
   using the list for comparing the start value of the desired log activity against the start value and the end value of accessible log files in the active index.

4. The method of claim 1, wherein:
selecting one of the log files in the inventory of log files of the current index file; comprises:
   selecting the oldest log file in the current index file.

5. The method of claim 1, wherein:
the current index file comprises an index of active logs and an index of archive logs; and
selecting one of the log files in the inventory of log files of the current index file; comprises selecting the oldest log file in the index of archive logs.

6. The method of claim 1 further comprising:
performing at least one of:
  performing a data recovery operation on the computer system based upon the information obtained by accessing the select log file that includes the desired log activity; and
  generating a data report on the computer system based upon the information obtained by accessing the select log file that includes the desired log activity.

7. The method of claim 1 further comprising:
generating, by a native process associated with the active index file, the backup of the index file when an archive log file is being added to the active index file.

8. Computer-readable hardware that stores machine-executable program code for extending the reporting range of log activity, wherein the program instructs a processor to:
  receive an indication of a desired log activity to be retrieved;
  designate an active index file that is utilized by the computer system, as a current index file wherein the current index file includes an inventory of log files comprising active log files, archive log files or both, and the current index file is constrained in the number of log files therein; and
  perform a searching operation in an iterative process until a predetermined stopping condition is met, the searching operation instructing the processor to:
    determine whether the desired log activity is within any of the log files of the current index file;
    perform, if the determination indicates that the desired log activity is not within the current index file, an operation to obtain a new index file that:
      selects one of the log files in the inventory of log files of the current index file;
      determines a backup index file that was created when the selected one of the log files was added to the active index file at some historical point, where the backup index is separate from the active index file; and
      designates the backup index file as a new instance of the current index file, and
    access a select log file within the current index file that includes the desired log activity, if it is determined that the desired log activity is within the current index file, and designating the predetermined stopping condition satisfied.

9. The computer-readable hardware of claim 8, wherein:
machine-executable program code to perform a searching operation in an iterative process, comprises:
  machine-executable program code to build a list of the log files in the current index file; and
machine-executable program code determine whether the desired log activity is within any of the log files of the current index file, comprises:
  machine-executable program code to use the list for comparing the desired log activity against the log files in the current index file.

10. The computer-readable hardware of claim 8, wherein:
machine-executable program code to receive an indication of a desired log activity to be retrieved comprises:
  machine-executable program code to receive an indication of a start value for the desired log activity to be retrieved;
machine-executable program code to perform a searching operation in an iterative process, comprises:
  machine-executable program code to build a list of the log files in the current index file; and
machine-executable program code to determine whether the desired log activity is within any of the log files of the current index file, comprises:
  machine-executable program code to identify at least a start value and an end value of log activity in each log file in the current index file; and
  machine-executable program code to use the list for comparing the start value of the desired log activity against the start value and the end value of accessible log files in the active index.

11. The computer-readable hardware of claim 8, wherein:
machine-executable program code to select one of the log files in the inventory of log files of the current index file, comprises:
  machine-executable program code to select the oldest log file in the current index file.

12. The computer-readable hardware of claim 8, wherein:
the current index file comprises an index of active logs and an index of archive logs; and
machine-executable program code to select one of the log files in the inventory of log files of the current index file, comprises:
  machine-executable program code to select the oldest log file in the index of archive logs.

13. The computer-readable hardware of claim 8 further comprising at least one of:
  machine-executable program code to perform a data recovery operation on the computer system based upon the information obtained by accessing the select log file that includes the desired log activity; and
  machine-executable program code to generate a data report on the computer system based upon the information obtained by accessing the select log file that includes the desired log activity.

14. The computer-readable hardware of claim 8 further comprising:
  machine-executable program code to generate, by a native process associated with the active index file, the backup of the index file when an archive log file is being added to the active index file.

15. An apparatus for extending the reporting range of log activity in a computer system, the apparatus comprising:
  a processor coupled to a memory, wherein the processor is programmed to perform extending the reporting range of log activity by executing program code to:
    receive an indication of a desired log activity to be retrieved;
    designate an active index file that is utilized by the computer system, as a current index file wherein the current index file includes an inventory of log files comprising active log files, archive log files or both, and the current index file is constrained in the number of log files therein; and
    perform a searching operation in an iterative process until a predetermined stopping condition is met, the searching operation including program code to:
      determine whether the desired log activity is within any of the log files of the current index file;
      perform, if the determination indicates that the desired log activity is not within the current index file, an operation to obtain a new index file by:
        select one of the log files in the inventory of log files of the current index file;
        determine a backup index file that was created when the selected one of the log files was added to the active index file at some historical point, where the backup index is separate from the active index file; and designate the backup index file as a new instance of the current index file, and access a select log file within the current index file that includes the desired log activity, if it is determined that the desired log activity is within the current index file, and designating the predetermined stopping condition satisfied.

16. The apparatus of claim 15, wherein:

the processor executes program code to perform a searching operation in an iterative process, by executing program code to:

build a list of the log files in the current index file; and the processor executes program code to determine whether the desired log activity is within any of the log files of the current index file, by executing program code to:

use the list for comparing the desired log activity against the log files in the current index file.

17. The apparatus of claim 15, wherein:

the processor executes program code to receive an indication of a desired log activity to be retrieved, by executing program code to:

receive an indication of a start value for the desired log activity to be retrieved;

the processor executes program code to perform a searching operation in an iterative process, by executing program code to:

build a list of the log files in the current index file; and the processor executes program code to determine whether the desired log activity is within any of the log files of the current index file, by executing program code to:

identify at least a start value and an end value of log activity in each log file in the current index file; and use the list for comparing the start value of the desired log activity against the start value and the end value of accessible log files in the active index.

18. The apparatus of claim 15, wherein:

the processor executes program code to select one of the log files in the inventory of log files of the current index file, by executing program code to:

select the oldest log file in the current index file.

19. The apparatus of claim 15, wherein:

the current index file comprises an index of active logs and an index of archive logs; and the processor executes program code to select one of the log files in the inventory of log files of the current index file, by executing program code to:

select the oldest log file in the index of archive logs.

20. The apparatus of claim 15, wherein the program code is further configured such that:

the processor executes program code to perform least one of:

a data recovery operation on the computer system based upon the information obtained by accessing the select log file that includes the desired log activity; and a data report operation on the computer system based upon the information obtained by accessing the select log file that includes the desired log activity.

21. The apparatus of claim 15, wherein the program code is further configured such that:

the processor executes program code to generate, by a native process associated with the active index file, the backup of the index file when an archive log file is being added to the active index file.

\* \* \* \* \*